May 12, 1925.  1,537,871
W. A. NEWMAN
TRANSMISSION GEAR
Filed April 7, 1921   5 Sheets-Sheet 2
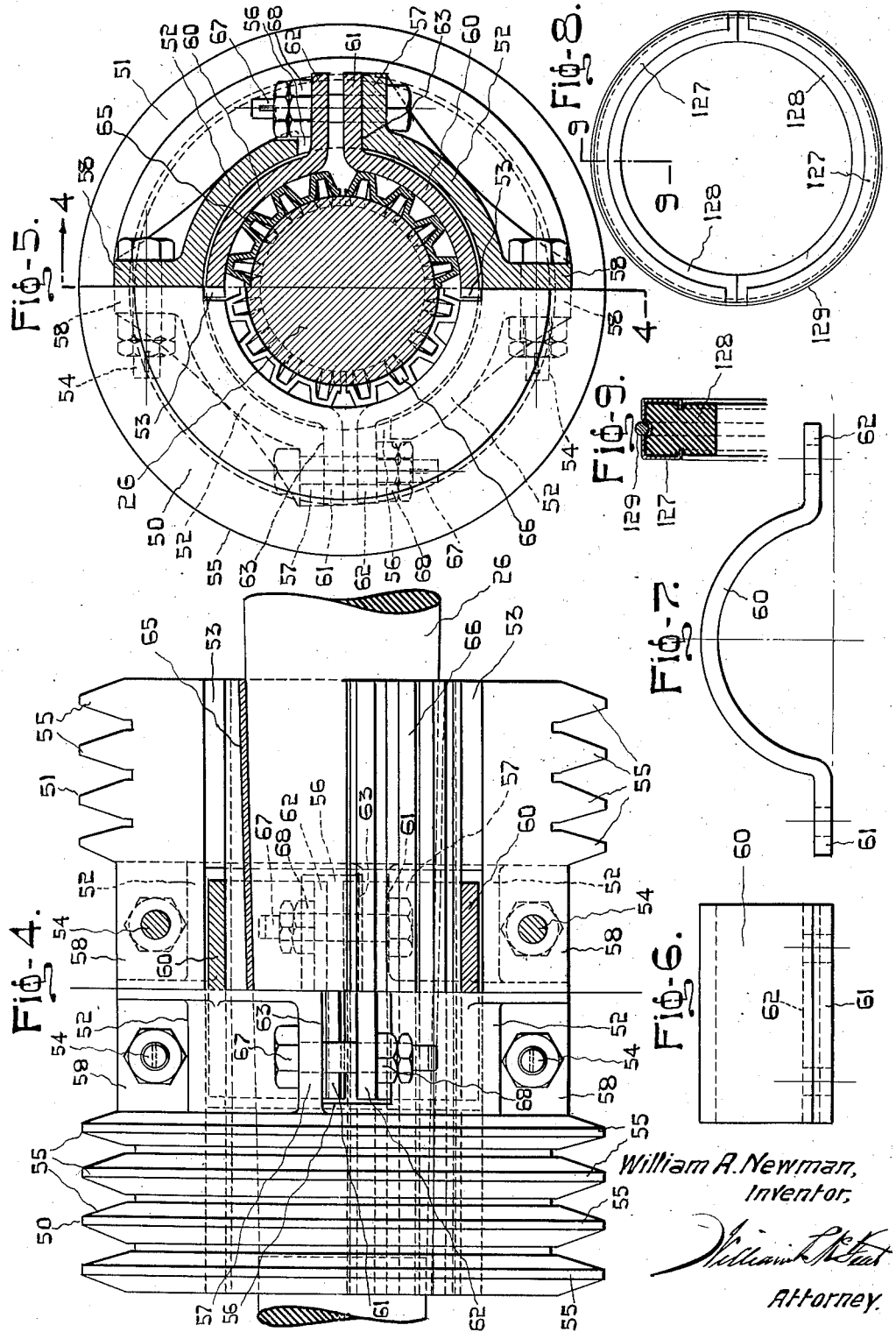
William A. Newman,
Inventor,
Attorney.

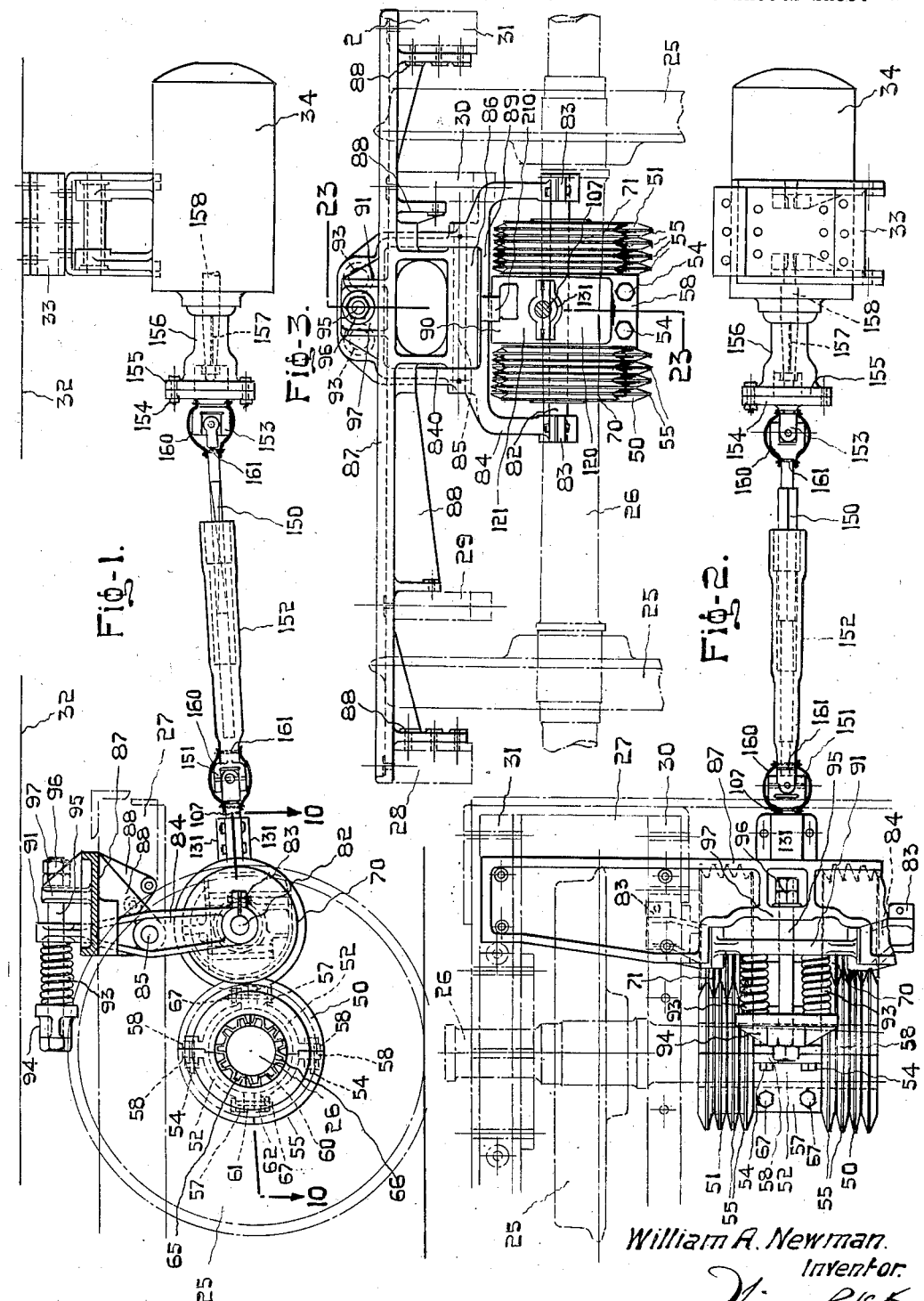

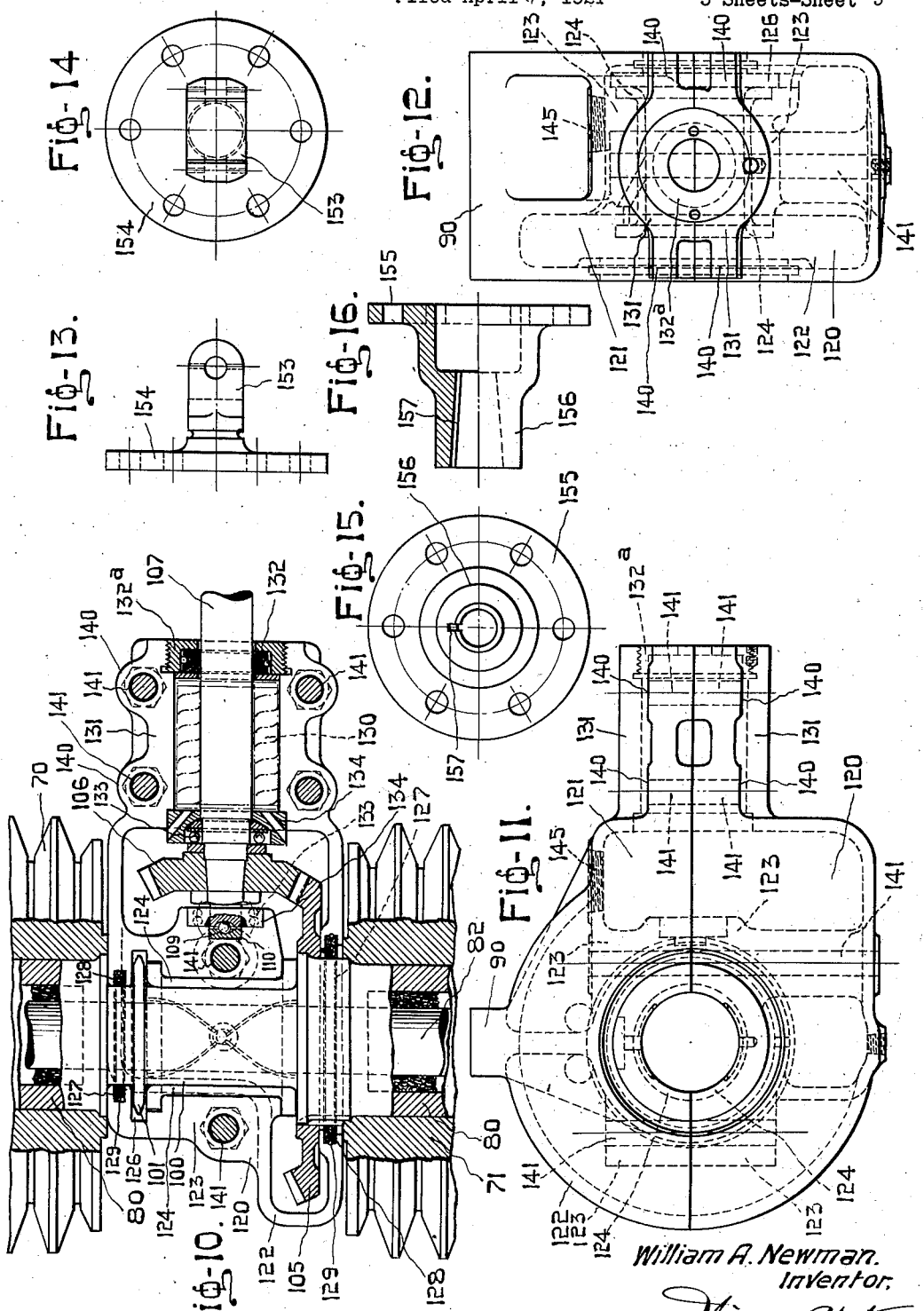

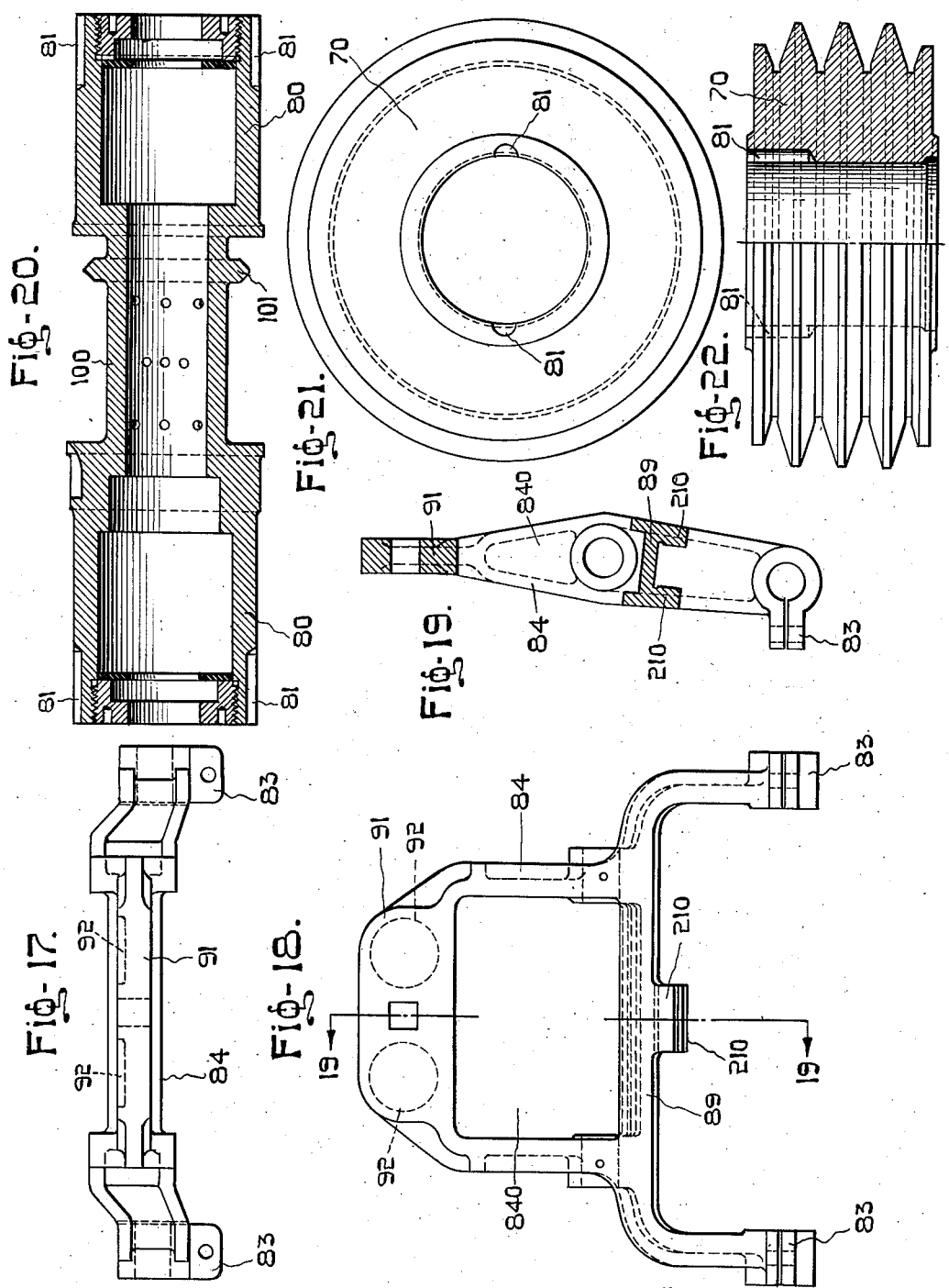

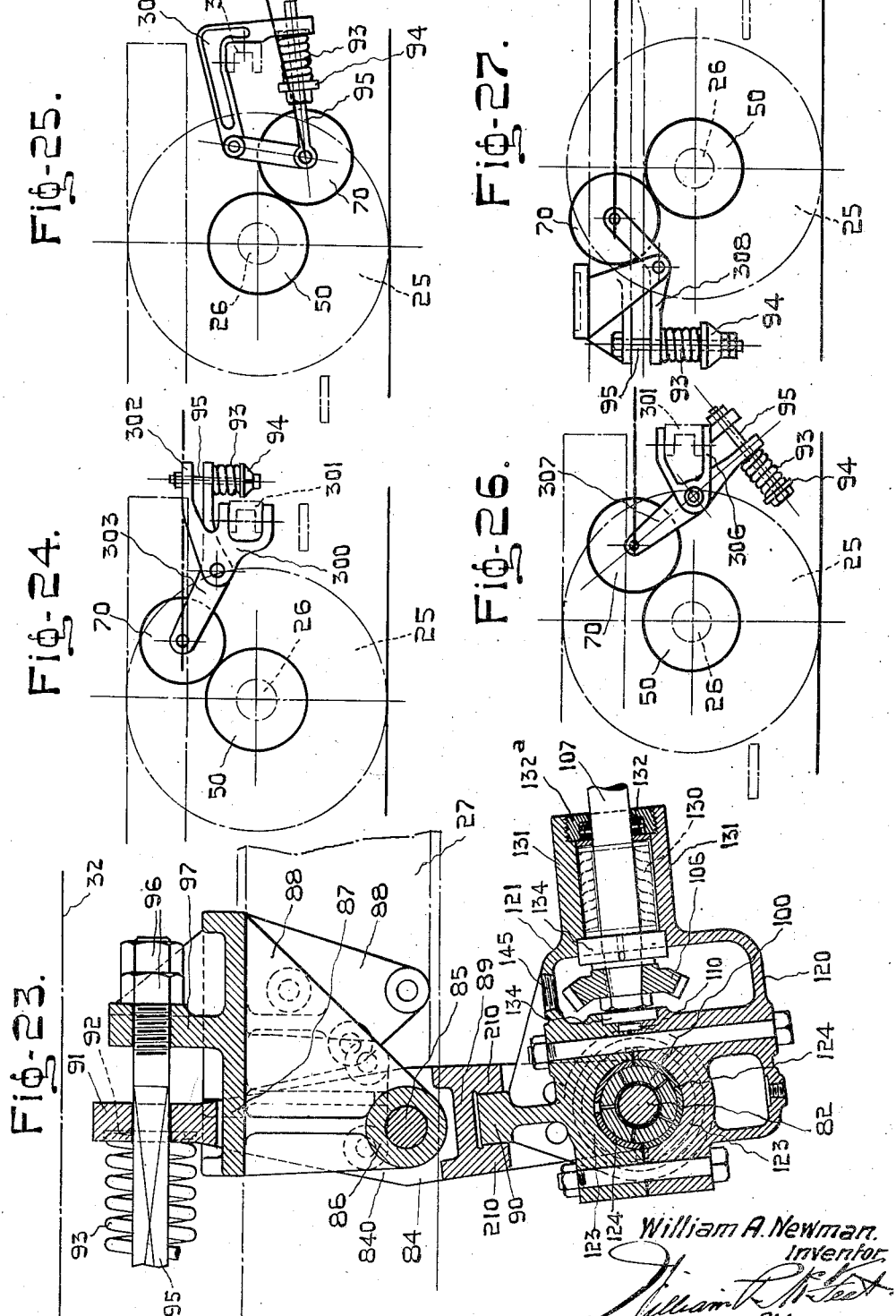

Patented May 12, 1925.

1,537,871

UNITED STATES PATENT OFFICE.

WILLIAM A. NEWMAN, OF MONTREAL, QUEBEC, CANADA.

TRANSMISSION GEAR.

Application filed April 7, 1921. Serial No. 459,505.

*To all whom it may concern:*

Be it known that I, WILLIAM A. NEWMAN, of the city of Montreal, Province of Quebec, Dominion of Canada, a subject of the King of Great Britain, have invented certain new and useful Improvements in Transmission Gears; and I do hereby declare that the following is a full, clear, and exact description thereof.

Heretofore many attempts have been made to solve the problem of the transmission of power from driving to driven points, the distance between and angular position of which fluctuates, and particularly where the transmission gear is exposed to the elements and subjected to severe vibration as in the case of the transmission of torque from an axle of a railway passenger car or other vehicle to an electric dynamo carried by the body of the vehicle. Great difficulty has been experienced, however, in providing an effective frictional connection between the axle and transmission gear, and at the same time accommodate excessive strain between these parts by allowing the necessary slip in the connection. The object of my invention is to overcome these defects and increase the utility of a transmission gear for this purpose by adapting the same for ready disconnection and reassembling of the parts with minimum manual labor.

To this end my invention consists of members effecting a multiple frictional connection between the driving member and the transmission gear of which they form a part, means maintaining an effective frictional connection between these parts by making the inner of these parts a floating member and providing direct and positive rotative connection between this floating member of the transmission gear and the shaft which reaches to the dynamo; and providing for the lubrication of this operative connection and the protection thereof from dust and other foreign particles by a sealed oil casing, while the said transmission shaft is telescopic with its members in positive rotative connection, the opposite ends being rotatively connected to the dynamo and floating member.

In order to illustrate my invention I will describe my preferred embodiment thereof which is an application of the same to the electric lighting equipment of a passenger coach. The axle member consists of a roller presenting multiplex radially protruding annular and angular friction faces interengaging multiplex frictional faces on a floating roller of corresponding formation mounted on a countershaft carried in a hanger through which it is caused to bear on the axle-roller with effective frictional engagement by a spring mechanism carried by the frame of the car truck and adjustable to meet varying conditions. This friction drive is in itself an important feature of my invention because while transmitting power from the driving member upon the axle to the driven member on the countershaft with a high degree of torque it allows one member to suddenly and momentarily increase its speed of rotation or lag without damage to either member, and also allows either member to be instantly removed from the other member without disturbing either member with relation to its carrying part. This is important in the dropping of wheels as is necessary for turning tires and other reasons. The connection between the driving friction roll and the axle and the connection of the driven friction roll to its countershaft are also an important feature of my invention. The connection between the driving roll and the axle consists of the roll with its hub formed in two parts and connected rigidly to the axle by an exteriorily operated internal clamp which permits of the rigid connection being effected without disturbing the diameter of the hub. In order to effect a more positive connection and more uniformly distribute the torque from the axle through the transmission gear to the dynamo, I prefer to employ duplex friction rolls on the axle and duplex driven rolls, each member with its duplex rolls being a unitary device. The connection between the driven duplex roll and the power transmitting shaft consists of a countershaft carrying the duplex friction rolls and including gears for transmitting the rotation of the axle to the transmission shaft which is caused to rotate at right angle to the axle, the gears being housed in a lubricant-case including journal-box and thrust and anti-friction bearing properties; the scheme of lubrication being carried through the pivotal connections of the transmission shaft. This transmission shaft is made to transmit rotative power and at the same time accommodate varying relative angular positions of the dynamo on the car body and the axle by telescopic formation and rectangular cross section.

For full comprehension, however, of my invention reference must be had to the accompanying drawings in which similar reference characters indicate the same parts and wherein:

Figure 1 is a side elevation of my improved friction drive applied to an operative connection between an axle and the dynamo of an electric lighting plant on a railway passenger car, the axle and part of the end frame being shown in fragmentary sectional view;

Figure 2 is a plan view thereof;

Figure 3 is an elevation view from the dynamo towards the axle;

Figure 4 illustrates in detail the axle roll partly in sectional view, partly in elevation and partly in fragmentary view, the sectional view being taken on line 4—4 Fig. 5;

Figure 5 is an end elevation partly in transverse section of the axle roll illustrated in Figure 4;

Figures 6 and 7 are detail elevations of one of the members of the clamp;

Figure 8 is an elevation of one of the packing rings;

Figure 9 is a section on line 9—9 of Figure 8;

Figure 10 is a horizontal sectional view taken on line 10—10 Fig. 1;

Figure 11 is a side elevation of the complete case;

Figure 12 is an end elevation thereof;

Figures 13, 14, 15 and 16 are details of the combined thrust and ball bearing for the axle end of the transmission shaft;

Figures 17 and 18 illustrate in detail front elevation plan and end elevation the hanger for the floating friction roll;

Figure 19 is a sectional view taken on line 19—19 Figure 18;

Figure 20 is a longitudinal sectional view of the hollow shaft of the floating roll;

Figure 21 is a part end elevation part sectional view of the floating roll;

Figure 22 is a part side elevation and part axial sectional view of the floating roll drawn to a larger scale;

Figure 23 is a vertical sectional view taken on line 23—23 Figure 3;

Figures 24, 25, 26 and 27 illustrate the different arrangement of the essential parts of my transmission gear.

Standard parts of a railway passenger coach are indicated as follows: wheels at 25, an axle 26, truck sills 27, 28, 29, 30 and 31 respectively, the underframe of a car at 32, a dynamo bracket 33 and the dynamo at 34. The dynamo is mounted on the car body and the power for operating it comes from one of the axles of the coach, 26 for instance; and it being necessary to, at times, drop the wheels for repairs, and the initial connection between the axle and the transmission gear being carried by the axle, I have provided for this dropping of the wheels without dismembering the major portion of the transmission gear by effecting the operative connection between the axle and the transmission gear through a floating member automatically maintaining an effective operative connection while the wheels are not in place and remaining in readiness to reassume this effective operative connection automatically when the wheels are restored or others are substituted. The initial operating member, according to my invention, is the duplex roll illustrated in Figures 4, 5, 6 and 7. This roll is made in two parts 50 and 51 preferably of cast iron with a cylindrical middle portion 52 having integral lugs 53 by which the parts are bolted together as at 54. The ends of these half rolls have a multiple V-friction surface 55 extending approximately over one-third the length from each end inward, the middle third being of reduced diameter to form the cylindrical portion 52 with flanges 58, and has through-slots 56, while a radial flange 57 projects from each roll-part at one edge of its slot. These flanges 57 are disposed at one edge of its slot opposite to the side of the other slot at which the other flange is located. This surface structure presenting multiplex inclined relatively shallow friction faces presenting V-form in cross section, their shallow depth reducing to a minimum the slipping between engaging friction surfaces of this duplex roll and that driven by it. The clamp which I have devised for rigidly fastening this roll to the axle without disturbing its diameter consists of a pair of substantially semi-circular plates 60 of spring steel or other suitable material, each having its opposite ends bent to present flanges 61 and 62, the width of the clamp being substantially equal to but slightly less than the width of the cylindrical portion 52 of the roll. The inside diameter of the hub and clamp are sufficiently larger than the axle to accommodate a resilient serrated metal bushing made in two parts 65 and 66 respectively. In assembling this roll and fastening it to the axle one half of the roll first has the clamps set therein with the flange 61 of one clamping member and the flange 62 of the other projecting into its slot 56. The other half of the roll is then fitted in place, with the opposite ends of the clamping ends projecting through its slot, after which the serrated bushing is inserted and the clamping action is produced by bolts 67 carried by the flanges 57 and projecting through holes in the flange 62, the clamping being done by nuts 68 by tightening which the flanges 62 are drawn towards the flanges 57 and the clamps fulcruming through their opposite flanges 61 on the faces 63 are tightened upon the bushing, thus rigidly fastening the roll in place.

The driven multiple-V friction-roll consists of independent roll parts rigidly fastened on a hollow shaft rotatably and axially movably carried in a floating manner and so arranged that it is adapted to automatically effectively engage the driving roll under all conditions. These roll parts are indicated in Figures 10 and 22 and as both parts are the same in all respects I will describe one only. This roll consists of a solid member 70 having friction surface similar to the rolls 50 and 51 in that it is of multiplex V-form and like the rolls 50 and 51 this V-formation is relatively shallow to carry out the idea in the rolls 50 and 51 of reducing to a minimum the slip between the intermeshing friction faces. The other roll of this pair is indicated at 71, both rolls are set rigidly on the ends 80 of a hollow shaft by being keyed thereto as at 81. This hollow shaft is mounted rotatably and slidably on a shaft 82 clamped as at 83 in the lower ends of a forked hanger 84 having an aperture 840 and illustrating in detail in Figures 8, 9 and 10. This hanger is fulcrumed between its ends upon a shaft 85 journalled in a sleeve 86 cast on a bracket 87 resting upon the sills 28, 29, 30 and 31 of the truck to which it is connected by flanges 88. The hanger has a cross brace 89 with flanges or lugs 210 which will be hereinafter referred to. The aperture 840 accommodates the sleeve 86. Normally the position of this hanger is with the rolls carried thereby in their extreme position towards the axle and it is held yieldingly in this position by the following means: it has a head 91 having a pair of spring seats 92 in which bear a pair of expansile and contractile helical springs 93, the oppsite ends of which are engaged by a cross-head 94 in which the springs are held in tension by a bolt 95 adjusted by nuts 96 bearing upon a flange 97 carried rigidly by the top of the bracket 87 through which the bolt passes, the bolt also passing through the head 91 of the hanger and the bolt and the hole through the head being rectangular in cross section in order to prevent the bolt from turning, thus maintaining proper relative positions of the cross-head and the head of the hanger and consequently the springs between it. This hanger and its spring mechanism constitute the means maintaining an effective frictional connection between the rolls carried thereby and those upon the axle, and owing to the freedom of movement of the rollers hung in this carrier under the yielding resistance of the springs they have imparted to them the nature of a floating member.

The positive connection between the floating member and the dynamo is effected by the following means: the hollow shaft 80 has a middle portion 100 of reduced diameter and provided near one end with a rigid collar 101. A mitre gear 105 is fitted rigidly on the hollow shaft in close proximity to the roller 71 and a mitre pinion 106 intermeshing with this mitre gear is mounted rigidly on a short shaft 107 near one end thereof, which has a concavity forming one side of an elliptical race for the ball 109 the opposite side of such race being presented by a hardened seat 110 seated in the lubricating casing before referred to. This casing is preferably made in two parts 120 and 121 as shown clearly in Figures 11 and 23. It has a circular body as shown particularly in Figure 10 with an enlargement 122 to accommodate the mitre gear 105. The middle of the casing has a hub 123 containing brasses 124 with suitable interior oil grooves, the casing through this hub and the journal 124 rides upon the middle portion 100 of the hollow shaft, the collar 101 of the latter being accommodated in a chamber portion 126 in the hub while a collar 127 thus formed carries a packing 128 of felt or other suitable material held in a position by a coiled steel spring 129 or other suitable means. The edge of the casing surrounding the hood of the gear 105 is similarly provided with spring pressed packing. The short shaft 107 is journalled in a roller bearing 130 carried in an extension 131 of the casing and the outer end thereof through which the shaft member projects is furnished with packing rings 132 mounted in a screwthreaded plug 132ª, the inner end in addition to having the ball bearing 109 is also provided with ball bearings 133 preferably of the type having self aligning ball races 134. As before mentioned this casing is divided into two parts. They are bolted together by bolts passed through lugs 140 and bolt holes 141, the upper part has an oil charging port closed by a plug 145 through which the lower half of the casing is filled with oil, grease or other suitable lubrication. This short shaft section 107 has its outer end connected to the adjacent end of the inner member of a telescopic shaft 150 by a universal connection 151. This shaft part 150 is of rectangular cross section and fits in a hollow shaft member 152 the opposite end of which is connected by a universal connection 153 with a flange 154 secured to a corresponding flange 155 with a sleeve 156 keyed as at 157 to the shaft 158 of the dynamo 34. The scheme of lubrication is carried to the universal or knuckle joints by leather covers 160 wired to the shaft at grooves 161, the cover being partly filled with grease or any suitable lubrication.

In order to prevent rotary displacement of the gear case on its supporting shaft 82 it is formed with a transverse flange 90 which registers with the legs 210 upon the under side of the transverse cross-brace 89. This arrangement of flanges prevents rotation of the gear case.

The particular arrangement of the power transmitting member and the means for carrying the floating member may be varied within the spirit of my invention as indicated in Figures 24, 25, 26 and 27. In this modification Figure 24 illustrates the carrier for the floating member comprising a bracket 300 of forked form, the forked end of which is fastened rigidly to a member 301 of the truck while the opposite end 302 of the fork supports the adjusting bolt 95 of the springs 93, the connection being effected as above described through the medium of a cross head 94. The spring in this case acts on the end of a lever 303, the free end of which carries the floating member 70. In Figure 25 the bracket 305 is of angular form and the bolt 95 is connected at one end to the shaft of floating member 70 while the opposite end is carried by the bracket, the spring 93 being confined between the cross head 94 and the bracket, the cross head being adjustable along the bolt for the purpose of varying the tension of the springs. The embodiment shown in Figure 26 involves a forked bracket 306 and a straight lever 307. Figure 27 has an angular lever 308.

*Operation.*

When it is necessary to drop the wheels the car is run over the usual pit and no operation is necessary other than that of dropping the wheels. As the wheels are dropped the duplex friction rolls 50 and 51 leave the floating roll and the springs 93 throw the hanger to its extreme position towards the position occupied by the axle until the upper end of the hanger engages bracket. If, however, it is necessary to remove the duplex rolls 50 and 51, bolts 67 are first removed thus releasing the clamp following which the bolts 54 are removed thus dismembering the roll and permitting it to be removed.

To remove the floating roll and its carrying mechanism from the truck. It may be removed in its entirety by removing shaft 82 or the hanger and the floating roll and gear case may be removed by taking out the bolt 95 and, incidently removing springs 93. Shaft 85 is then withdrawn, thus releasing the hanger and allowing it to be displaced. The member of the telescopic shaft connected to the gear case, the gear case and the parts contained therein being then free to be removed for repair or other purposes and replaced again or any similar equipment substituted for it without disturbing the initial drive roll on the axle or the dynamo. The telescopic shaft also permits the dynamo to be displaced and another substituted for it without disconnecting more than the usual fittings which fasten it to its bracket, and without disturbing any of the truck or axle equipment.

Power is transmitted from the axle 26 through floating roll 70 and 71, hollow shaft 80, mitre gears 105, 106, shaft member 107, telescopic shaft 150 and 152 to the dynamo, the floating nature of the rolls 70—71 accommodating the play between the truck frame and axle while the universal jaws at the end of the telescopic shaft and the telescopic nature of the shaft itself accommodates angular displacement contingent upon the dynamo being carried by the car body and the driving gear upon the truck frame and axle. This particular arrangement of parts and the application of multiple-V friction to the friction rolls reduces to a minimum the defects contingent upon the transmission of torque by the gear heretofore in use. Furthermore the utility of the transmission gear is by my invention increased by adapting the same for ready disconnection and assembling of the parts with minimum manual labor and expedition.

What I claim is as follows:

1. In the transmission of power the combination with a driven axle and a member mounted thereon and adapted to transmit rotation, a part to be driven, the angular position whereof relatively to the axle is variable, of transmission mechanism consisting of a floating member in operative relation with the member upon the axle, means including universal rotative connections between the floating member and part to be driven, and means yieldingly maintaining the floating member in the rotative relation with the member upon the axle.

2. In the transmission of power the combination with a driven axle and a member mounted thereon and adapted to transmit rotation, such member presenting circumferential friction faces, a part to be driven the angular position whereof relatively to the axle is variable, of transmission mechanism consisting of a floating member presenting multiple circumferential friction faces in operative relation with the member upon the axle, means including universal rotative connections between the floating member and part to be driven, and means yieldingly maintaining the floating member in rotative relation with the member upon the axle.

3. In the transmission of power the combination with a driven axle and a member mounted thereon and adapted to transmit rotation, such member presenting multiplex radial protruding annular and angular friction faces, a part to be driven the angular position whereof relatively to the axle is variable, of transmission mechanism consisting of a floating member presenting multiplex radial protruding annular and angular friction faces in operative relation with the member upon the axle, means including universal rotative connections between the floating member and part to be driven, and means yieldingly maintaining the floating member in rotative relation with the member upon the axle.

4. In the transmission of power the combination with a driving shaft and a part to be driven mounted movably relatively to the driving shaft of transmission mechanism operatively connected at one end to the part to be driven and means effecting operative connection between the opposite end and the shaft, such last mentioned means including a member carried rotatively and connected to the shaft and a second member in operative relation therewith, the said members presenting interengaging multiplex radial protruding annular and angular friction faces, and means yieldingly maintaining an operative connection between the said members.

5. In the transmission of power the combination with a driving shaft, an axle and a member rotatively mounted thereon, such member presenting radial protruding annular and angular friction faces and a part to be driven, the angular position between the driving shaft and the said member being variable, of power transmission mechanism effecting operative connection between the member upon the axle and the said part to be driven, means operatively connecting one end of the mechanism to the part to be driven, means supporting the end of the mechanism contiguous to the member upon the axle, a part distinct from the axle, such last mentioned means being pivoted to the last mentioned part, a member carried by the said end of the mechanism, such member being a companion to the member upon the axle, and presenting multiplex radial protruding annular and angular friction faces interengaging the friction faces on the driving member, and spring mechanism yieldingly maintaining the said second member in engagement with the member upon the axle.

6. In the transmission of power from the axle of a car to a light generator on the body of the car the combination with an axle, the sills of the truck and the under-frame of the car body, of a power transmission member carried rotatively by the axle and power transmission mechanism connecting the member upon the axle to the light generator, the last mentioned mechanism including a floating member, means for supporting the floating member consisting of a bracket fastened to the sills of the truck, a hanger pivoted between its ends to the bracket and having the floating member mounted in its lower end, and spring mechanism acting upon the upper end of the hanger and yieldingly maintaining the floating member in rotative engagement with the member upon the axle.

7. In the transmission of power from the axle of a car to a light generator on the body of the car the combination with an axle, the sills of the truck and the under-frame of the car body, of a power transmission member carried rotatively by the axle and power transmission mechanism connecting the member upon the axle to the light generator, the last mentioned mechanism including a floating member, means for supporting the floating member consisting of a bracket fastened to the sills of the truck, a hanger pivoted between its ends to the bracket and having the floating member mounted in its lower end, and spring mechanism acting upon the upper end of the hanger and yieldingly maintaining the floating member in rotative engagement with the member upon the axle and means limiting the throw of the hanger under the influence of the spring.

8. In the transmission of power from the axle of a car to a light generator on the body of the car the combination with an axle, the sills of the truck and the under-frame of the car body, of a power transmission member carried rotatively by the axle and power transmission mechanism connecting the member upon the axle to the light generator, the last mentioned mechanism including a floating member, means for supporting the floating member consisting of a bracket fastened to the sills of the truck, a hanger pivoted between its ends to the bracket and having the floating member mounted in its lower end, and spring mechanism acting upon the upper end of the hanger and yieldingly maintaining the floating member in rotative engagement with the member upon the axle, the upper end of the hanger presenting spring seats, the said spring mechanism consisting of a cross head, a bolt carried by the bracket, expansile helical springs located between the cross head and the head of the hanger, means for adjusting the bolt for the purpose of varying the tension of the springs.

9. In the transmission of power from the axle of a car to a light generator on the body of the car the combination with an axle, the sills of the truck and the under-frame of the car body, of a power transmission member carried rotatively by the axle and power transmission mechanism connecting the member upon the axle to the light generator, the last mentioned mechanism including a floating member, means for supporting the floating member consisting of a bracket fastened to the sills of the truck and presenting an upstanding flange, a hanger pivoted between its ends to the bracket and having the floating member mounted in its lower end, and spring mechanism acting upon the upper end of the hanger and yieldingly maintaining the floating member in rotative engagement with the member upon the axle, the upper end of the hanger projecting through the bracket and presenting spring seats, the said spring mechanism consisting of a cross head, a bolt carrying the cross head and projecting freely through the head of the hanger and carried by the bracket and having nuts for regulating the tension of the springs.

10. In the transmission of power from the axle of a car to a light generator on the body of the car the combination with an axle, the sills of the truck and the under frame of the car body, of a power transmission member carried rotatively by the axle and power transmission mechanism connecting the member upon the axle to the light generator, the last mentioned mechanism including a floating member, means for supporting the floating member consisting of a bracket fastened to the sills of the truck, a hanger pivoted between its ends to the bracket and having the floating member mounted in its power end, and spring mechanism acting upon the upper end of the hanger and yieldingly maintaining the floating member in rotative engagement with the member upon the axle and means limiting the throw of the hanger under the influence of the spring consisting of fixed jaws upon the bracket and a member carried rigidly by the hanger and having limited movement between the jaws.

11. In transmission gear of the type described a detachable member consisting of the combination with an axle, a member rotatively mounted thereon and a part to be driven, of a fixed bracket, a hanger pivoted between its ends to the bracket and having a floating member mounted in its lower end, spring mechanism acting upon the upper end of the hanger and yieldingly maintaining the floating member in rotative engagement with the member upon the axle and means for effecting operative connection with the part to be driven.

12. In transmission gear of the type described a detachable member consisting of the combinatioin with an axle, a member rotatively mounted thereon and a part to be driven, of a fixed bracket, a hanger pivoted between its ends to the bracket and having a floating member mounted in its lower end, spring mechanism acting upon the upper end of the hanger and yieldingly maintaining the floating member in rotative engagement with the member upon the axle and means for effecting operative connection with the part to be driven, the upper end of the hanger presenting spring seats, the said spring mechanism consisting of a cross head, a bolt carried by the bracket, expansile helical springs located between the cross head and the head of the hanger, and means for adjusting the bolt for the purpose of varying the tension of the springs.

13. In transmission gear of the type described a detachable member consisting of the combination with an axle, a member rotatively mounted thereon and a part to be driven, of a fixed bracket, a hanger pivoted between its ends to the bracket and having a floating member mounted in its lower end, and spring mechanism acting upon the upper end of the hanger and yieldingly maintaining the floating member in rotative engagement with the member upon the axle, means for effecting operative connection with the part to be driven, the upper end of the hanger projecting through the bracket and presenting therein seats, the said spring mechanism consisting of a cross head, a bolt carrying the cross head and projecting freely through the head of the hanger and carried by the bracket and having nuts for regulating the tension of the springs.

14. In the transmission of power from the axle of a car to a light generator on the body of the car, the combination with an axle, the sills of the truck and the under frame of the car body, of a power transmission member carried rotatively by the axle and power transmission mechanism connecting the member upon the axle to the light generator, the last mentioned mechanism including a floating member, means for supporting the floating member consisting of a bracket fastened to the sills of the truck, a hanger pivoted between its ends to the bracket and having said floating member mounted in its lower end, a gear case carried by the hanger in fixed relation therewith, mitre gears in the gear case, means effecting rotative engagement between the floating member and the mitre gears, a bearing within the gear case, a shaft member journalled in the bearing and having one of the said mitre gears mounted rigidly thereon, means whereby the gear case is charged with oil and means for rotatively connecting the shaft member to the part to be driven.

15. In the transmission of power from the axle of a car to a light generator on the body of the car, the combination with an axle, the sills of the truck and the under frame of the car body, of a power transmission member carried rotatively by the axle and power transmission mechanism connecting the member upon the axle to the light generator, the last mentioned mechanism including a floating member, means for supporting the floating member consisting of a bracket fastened to the sills of the truck, a hanger pivoted between its ends to the bracket and having a rotatable floating member in its lower end, a gear case carried by the hanger in fixed relation therewith, mitre gears in the gear case, means effecting rotative engagement between the floating member and the mitre gears, a bearing within the gear case, a shaft member journalled in the bearing and having one of the said mitre gears mounted rigidly thereon, means whereby the gear case is charged with oil and means for rotatively connecting the shaft member to the part to be driven and means whereby the gear case is held against rotation in the hanger.

16. In the transmission of power the combination with a driving shaft and a part to be driven mounted movably relatively to the driving shaft, of transmission mechanism operatively connected at one end to the part to be driven and means effecting operative connection between the opposite end and the shaft, such last mentioned means including a member carried rotatively and connected to the shaft and a second member in operative relation therewith and means yieldingly maintaining an operative connection between the said members, such last mentioned means comprising a pair of intermeshing power transmitting members one mounted rigidly on the driving shaft and the other consisting of independent parts, an independent and relatively fixed part, a hanger pivoted to the fixed part, means limiting the rotation of the hanger on its pivot, spring mechanism yieldingly maintaining the hanger at one end of its limited movement, a shaft carried fixedly in the hanger, a hollow shaft mounted rotatively and slidably on the non-rotatable shaft, means rigidly securing the independent parts to the other of the said pair of power transmitting members upon the hollow shaft at the opposite ends thereof, a gear case enclosing the portion of the hollow shaft between the said parts of the power transmitting member, means effecting an oil tight rotatable connection between the hollow shaft and gear case, such gear case having a lateral extension containing a bearing, a shaft member journalled in the bearing, means packing the rotatable joint between the shaft member and outer end of the bearing, a mitre gear mounted rigidly on the hollow shaft within the gear case, a second mitre gear intermeshing with the first mitre gear and mounted rigidly upon the end of the shaft member within the gear case.

17. In the transmission of power the combination with a driving shaft and a part to be driven mounted movably relatively to the driving shaft, of transmission mechanism operatively connected at one end to the part to be driven and means effecting operative connection between the opposite end and the shaft, such last mentioned means including a member carried rotatively and connected to the shaft and a second member in operative relation therewith and means yieldingly maintaining an operative connection between the said members, such last mentioned means comprising a pair of intermeshing power transmitting members one mounted rigidly on the driving shaft and the other consisting of independent parts, an independent and relatively fixed part, a hanger pivoted to the fixed part, means limiting the rotation of the hanger on its pivot, spring mechanism yieldingly maintaining the hanger at one end of its limited movement, a shaft carried fixedly in the hanger, a hollow shaft mounted rotatively and slidably on the non-rotatable shaft, means rigidly securing the independent parts to the other of the said pair of power transmitting members upon the hollow shaft at the opposite ends thereof, a gear case enclosing the portion of the hollow shaft between the said parts of the power transmitting member, means effecting an oil tight rotatable connection between the hollow shaft and gear case, such gear case having an integral interior journal bearing with brasses riding upon the said hollow shaft, the said gear case having a lateral extension containing a bearing, a shaft member journalled in the bearing, means packing the rotatable joint between the shaft member and outer end of the bearing, a mitre gear mounted rigidly on the hollow shaft within the gear case between one end thereof and the journal, a second mitre gear intermeshing with the said first mitre gear and mounted rigidly upon the end of the shaft member within the gear case, means whereby a lubricant is introduced in the casing.

18. In the transmission of power the combination with a driving shaft and a part to be driven mounted movably relatively to the driving shaft, of transmission mechanism operatively connected at one end to the part to be driven and means effecting operatively connection between the opposite end and the shaft, such last mentioned means including a member carried rotatively and connected to the shaft and a second member in operative relation therewith and means yieldingly maintaining an operative connection between the said members, such last mentioned means comprising a pair of intermeshing power transmitting members one mounted rigidly on the driving shaft and the other consisting of independent parts, an independent and relatively fixed part, a hanger pivoted to the fixed part, means limiting the rotation of the hanger on its pivot, spring mechanism yieldingly maintaining the hanger at one end of its limited movement, a shaft carried fixedly in the hanger, a hollow shaft mounted rotatively and slidably on the non-rotatable shaft, means rigidly securing the independent parts to the other of the said pair of power transmitting members upon the hollow shaft at the opposite ends thereof, a gear case enclosing the portion of the hollow shaft between the said parts of the power transmitting member, means effecting an oil tight rotatable connection between the hollow shaft and gear case, such gear case having an integral interior journal bearing with brasses riding upon the said hollow shaft, means preventing axial movement between the hollow shaft and gear case, the said gear case having a lateral extension containing a bearing, a shaft member journalled in the bearing, means packing the rotatable joint between the shaft member and outer end of the bearing, a mitre gear mounted rigidly on the hollow shaft within the gear case between one end thereof and the journal, a second mitre gear intermeshing with the said first mitre gear and mounted rigidly upon the end of the shaft member within the gear case, means whereby a lubricant is introduced in the casing.

19. In the transmission of power the combination with a driving shaft and a part to be driven mounted movably relatively to the driving shaft, of transmission mechanism operatively connected at one end to the part to be driven and means effecting operative connection between the opposite end and the shaft, such last mentioned means including a member carried rotatively and connected to the shaft and a second member in operative relation therewith and means yieldingly maintaining an operative connection between the said members, such last mentioned means comprising a pair of intermeshing power transmitting members one mounted rigidly on the driving shaft and the other consisting of independent parts, an independent and relatively fixed part, a hanger pivoted to the fixed part, means limiting the rotation of the hanger on its pivot, spring mechanism yieldingly maintaining the hanger at one end of its limited movement, a shaft carried fixedly in the hanger, a hollow shaft mounted rotatively and slidably on the non-rotatable shaft, means rigidly securing the independent parts to the other of the said pair of power transmitting members upon the hollow shaft at the opposite ends thereof, a gear case enclosing the portion of the hollow shaft between the said parts of the power transmitting member, means effecting an oil tight rotatable connection between the hollow shaft and gear case, such gear case having an integral interior journal bearing with brasses riding upon the said hollow shaft, the said gear case having a lateral extension containing a bearing, a shaft member journalled in the bearing, means packing the rotatable joint between the shaft member and outer end of the bearing, a mitre gear mounted rigidly on the hollow shaft within the gear case between one end thereof and the journal, a second mitre gear intermeshing with the said first mitre gear and mounted rigidly upon the end of the shaft member within the gear case, means whereby a lubricant is introduced in the casing and a thrust bearing for the shaft member incorporated in the journal.

20. In the transmission of power the combination with a driving shaft and a part to be driven mounted movably relatively to the driving shaft, of transmission mechanism operatively connected at one end to the part to be driven and means effecting operative connection between the opposite end and the shaft, such last mentioned means including a member carried rotatively and connected to the shaft and a second member in operative relation therewith and means yieldingly maintaining an operative connection between the said members, such last mentioned means comprising a pair of intermeshing power transmitting members one mounted rigidly on the driving shaft and the other consisting of independent parts, an independent and relatively fixed part, a hanger pivoted to the fixed part, means limiting the rotation of the hanger on its pivot, spring mechanism yieldingly maintaining the hanger at one end of its limited movement, a shaft carried fixedly in the hanger, a hollow shaft mounted rotatively and slidably on the non-rotatable shaft, means rigidly securing the independent parts to the other of the said pair of power transmitting members upon the hollow shaft at the opposite ends thereof, a gear case enclosing the portion of the hollow shaft between the said parts of the power transmitting member, means effecting an oil tight rotatable connection between the hollow shaft and gear case, such gear case having an integral interior journal bearing with brasses riding upon the said hollow shaft, the said gear case having a lateral extension containing a bearing, a shaft member journalled in the bearing, means packing the rotatable joint between the shaft member and outer end of the bearing, a mitre gear mounted rigidly on the hollow shaft within the gear case between one end thereof and the journal, a second mitre gear intermeshing with the said first mitre gear and mounted rigidly upon the end of the shaft member within the gear case, means whereby a lubricant is introduced in the casing and a thrust bearing for the shaft member incorporated in the journal located between the second mentioned mitre gear and the lateral extension of the case.

21. In the transmission of power the combination with a driving shaft and a part to be driven mounted movably relatively to the driving shaft, of transmission mechanism operatively connected at one end to the part to be driven and means effecting operative connection between the opposite end and the shaft, such last mentioned means including a member carried rotatively and connected to the shaft and a second member in operative relation therewith and means yieldingly maintaining an operative connection between the said members, such last mentioned means comprising a pair of intermeshing power transmitting members one mounted rigidly on the driving shaft and the other consisting of independent parts, an independent and relatively fixed part, a hanger pivoted to the fixed part, means limiting the rotation of the hanger on its pivot, spring mechanism yieldingly maintaining the hanger at one end of its limited movement, a shaft carried fixedly in the hanger, a hollow shaft mounted rotatively and slidably on the non-rotatable shaft, means rigidly securing the independent parts to the other of the said pair of power transmitting members upon the hollow shaft at the opposite ends thereof, a gear case enclosing the portion of the hollow shaft between the said parts of the power transmitting member, means effecting an oil tight rotatable connection between the hollow shaft and gear case, such gear case having an integral interior journal bearing with brasses riding upon the said hollow shaft, the said gear case having a lateral extension containing a bearing, a shaft member journalled in the bearing, means packing the rotatable joint between the shaft member and outer end of the bearing, a mitre gear mounted rigidly on the hollow shaft within the gear case between one end thereof and the journal, a second mitre gear intermeshing with the said first mitre gear and mounted rigidly upon the end of the shaft member within the gear case, means whereby a lubricant is introduced in the casing and a thrust bearing for the shaft member incorporated in the journal located between the second mentioned mitre gear and the lateral extension of the case and a second thrust bearing between the inner end of the shaft member and the integral interior journal bearing.

22. In the transmission of power the combination with a driving shaft and a part to be driven mounted movably relatively to the driving shaft, of transmission mechanism operatively connected at one end to the part to be driven and means effecting operative connection between the opposite end and the shaft, such last mentioned means including a member carried rotatively and connected to the shaft and a second member in operative relation therewith and means yieldingly maintaining an operative connection between the said members, such last mentioned means comprising a pair of intermeshing power transmitting members one mounted rigidly on the driving shaft and the other consisting of independent parts, an independent and relatively fixed part, a hanger pivoted to the fixed part, means limiting the rotation of the hanger on its pivot, spring mechanism yieldingly maintaining the hanger at one end of its limited movement, a shaft carried fixedly in the hanger, a hollow shaft mounted rotatively and slidably on the non-rotatable shaft, means rigidly securing the independent parts to the other of the said pair of power transmitting members upon the hollow shaft at the opposite ends thereof, a gear case enclosing the portion of the hollow shaft between the said parts of the power transmitting member, means effecting an oil tight rotatable connection between the hollow shaft and gear case, such gear case having a lateral extension containing a bearing, a shaft member journalled in the bearing, means packing the rotatable joint between the shaft member and outer end of the bearing, a mitre gear mounted rigidly on the hollow shaft within the gear case, a second mitre gear intermeshing with the first mitre gear and mounted rigidly upon the end of the shaft member within the gear case and means for preventing rotation of the gear case relatively to the hollow shaft.

23. In the transmission of power the combination with a driving shaft and a part to be driven mounted movably relatively to the driving shaft, of transmission mechanism operatively connected at one end to the part to be driven and means effecting operative connection between the opposite end and the shaft, such last mentioned means including a member carried rotatively and connected to the shaft and a second member in operative relation therewith and means yieldingly maintaining an operative connection between the said members, such last mentioned means comprising a pair of intermeshing power transmitting members one mounted rigidly on the driving shaft and the other consisting of independent parts, an independent and relatively fixed part, a hanger pivoted to the fixed part, means limiting the rotation of the hanger on its pivot, spring mechanism yieldingly maintaining the hanger at one end of its limited movement, a shaft carried fixedly in the hanger, a hollow shaft mounted rotatively and slidably on the non-rotatable shaft, means rigidly securing the independent parts to the other of the said pair of power transmitting members upon the hollow shaft at the opposite ends thereof, a gear case enclosing the portion of the hollow shaft between the said parts of the power transmitting member means effecting an oil tight rotatable connection between the hollow shaft and gear case, such gear case having a lateral extension containing a bearing, a shaft member journalled in the bearing, means packing the rotatable joint between the shaft member and outer end of the bearing, a mitre gear mounted rigidly on the hollow shaft within the gear case, a second mitre gear intermeshing with the first mitre gear and mounted rigidly upon the end of the shaft member within the gear case and means for preventing rotation of the gear case relatively to the hollow shaft consisting of an extension on the gear case and a pair of fixed jaws upon the fixed part.

24. In the transmission of power the combination with a driving shaft and a part to be driven mounted movably relatively to the driving shaft, of transmission mechanism operatively connected at one end to the part to be driven and means effecting operative connection between the opposite end and the shaft, such last mentioned means including a member carried rotatively and connected to the shaft and a second member in operative relation therewith and means yieldingly maintaining an operative connection between the said members, such last mentioned means comprising a pair of intermeshing power transmitting members one mounted rigidly on the driving shaft and the other consisting of independent parts, an independent and relatively fixed part, a hanger pivoted to the fixed part, means limiting the rotation of the hanger on its pivot, spring mechanism yieldingly maintaining the hanger at one end of its limited movement, a shaft carried fixedly in the hanger, a hollow shaft mounted rotatively and slidably on the non-rotatable shaft, means rigidly securing the independent parts to the other of the said pair of power transmitting members upon the hollow shaft at the opposite ends thereof, a gear case enclosing the portion of the hollow shaft between the said parts of the power transmitting member, means effecting an oil tight rotatable connection between the hollow shaft and gear case, such gear case having an integral interior journal bearing with brasses riding upon the said hollow shaft, the said gear case having a lateral extension containing a bearing, a shaft member journalled in the bearing, means packing the rotatable joint between the shaft member and outer end of the bearing, a mitre gear mounted rigidly on the hollow shaft within the gear case between one end thereof and the journal, a second mitre gear intermeshing with the said first mitre gear and mounted rigidly upon the end of the shaft member within the gear case, means whereby a lubricant is introduced in the casing and means for preventing rotation of the gear case relatively to the hollow shaft.

25. In the transmission of power the combination with a driving shaft and a part to be driven mounted movably relatively to the driving shaft, of transmission mechanism operatively connected at one end to the part to be driven and means effecting operative connection between the opposite end and the shaft, such last mentioned means including a member carried rotatively and connected to the shaft and a second member in operative relation therewith and means yieldingly maintaining an operative connection between the said members, such last mentioned means comprising a pair of intermeshing power transmitting members one mounted rigidly on the driving shaft and the other consisting of independent parts, an independent and relatively fixed part, a hanger pivoted to the fixed part, means limiting the rotation of the hanger on its pivot, spring mechanism yieldingly maintaining the hanger at one end of its limited movement, a shaft carried fixedly in the hanger, a hollow shaft mounted rotatively and slidably on the non-rotatable shaft, means rigidly securing the independent parts to the other of the said pair of power transmitting members upon the hollow shaft at the opposite ends thereof, a gear case enclosing the portion of the hollow shaft between the said parts of the power transmitting member, means effecting an oil tight rotatable connection between the hollow shaft and gear case, such gear case having an integral interior journal bearing with brasses riding upon the said hollow shaft, the said gear case having a lateral extension containing a bearing, a shaft member journalled in the bearing, means packing the rotatable joint between the shaft member and outer end of the bearing, a mitre gear mounted rigidly on the hollow shaft within the gear case between one end thereof and the journal, a second mitre gear intermeshing with the said first mitre gear and mounted rigidly upon the end of the shaft member within the gear case, means whereby a lubricant is introduced in the casing and means for preventing rotation of the gear case relatively to the hollow shaft, consisting of an extension of the gear case and a pair of fixed jaws upon the fixed part.

26. In power transmission gear for transmitting rotation from the axle of a car to a dynamo on the body thereof in which the angular position of the dynamo relatively to the said axle varies, a bracket 87 for connecting the transmission gear to the truck, means securing the bracket to the sills of the truck, said bracket having an integral sleeve 86 and flange 97 for the purpose set forth.

27. In power transmission gear for transmitting rotation from the axle of a car to a dynamo on the body thereof in which the angular position of the dynamo relatively to the said axle varies, a hanger having an aperture and a cross brace forming the lower edge of the aperture, a head with spring seats and a bolt guiding opening, the lower end of the bracket being forked and of clamp formation.

In testimony whereof I have signed my name to this specification in the presence of two witnesses:

WILLIAM A. NEWMAN.

Witnesses:
  WILLIAM MORGAN,
  GORDON G. COOKE.